United States Patent [19]
Meedt

[11] Patent Number: 5,966,790
[45] Date of Patent: Oct. 19, 1999

[54] SEPARATING TOOL

[75] Inventor: Otto Meedt, Erlangen, Germany

[73] Assignee: Freistaat Bayern, vertreten durch die Friedrich-Alexander-Universität Erlangen-Nürnberg, diese vertreten durch den Rektor Prof. Dr. Gotthard Jasper, Germany

[21] Appl. No.: 09/000,448

[22] PCT Filed: May 26, 1997

[86] PCT No.: PCT/DE97/01115

§ 371 Date: Jan. 30, 1998

§ 102(e) Date: Jan. 30, 1998

[87] PCT Pub. No.: WO97/47437

PCT Pub. Date: Dec. 18, 1997

[30] Foreign Application Priority Data

Jun. 11, 1996 [DE] Germany .......................... 196 23 228

[51] Int. Cl.[6] .................................................. B23P 19/04
[52] U.S. Cl. .............................................. 29/239; 29/267
[58] Field of Search .......................... 29/239, 267, 268; 294/119, 68.25

[56] References Cited

U.S. PATENT DOCUMENTS

| | | |
|---|---|---|
| 1,727,245 | 9/1929 | Miller .......................................... 29/267 |
| 3,348,872 | 10/1967 | Kolinski .................................... 294/119 |
| 3,624,876 | 12/1971 | Irvin ......................................... 294/119 |
| 3,635,440 | 1/1972 | Van Gompel . |
| 3,749,365 | 7/1973 | Van Gompel . |
| 3,865,163 | 2/1975 | Root . |
| 4,169,622 | 10/1979 | Classen et al. ........................... 294/119 |
| 4,333,330 | 6/1982 | Porter . |
| 4,440,205 | 4/1984 | Hillinger . |
| 4,564,057 | 1/1986 | Zrostlik . |
| 4,869,465 | 9/1989 | Yirmiyahu et al. . |
| 5,029,814 | 7/1991 | Liegel et al. ............................. 254/122 |
| 5,593,137 | 1/1997 | Johnson .................................... 254/122 |
| 5,692,730 | 12/1997 | Gill ........................................... 254/122 |

*Primary Examiner*—David A. Scherbel
*Assistant Examiner*—Lee Wilson
*Attorney, Agent, or Firm*—Bachman & LaPointe, P.C.

[57] ABSTRACT

A tool for separating mutually connected parts which has a head part and at least two spreading elements which are movably connected to the head part in such a way that a force or a pulse applied to the head part is converted in the spreading elements into a force component which is in the same direction and into a force component which is perpendicular thereto and which is operable to move the parts to be separated away from each other.

10 Claims, 5 Drawing Sheets

5,966,790

SEPARATING TOOL

FIELD OF THE INVENTION

The invention concerns a tool for separating mutually united parts.

BACKGROUND OF THE INVENTION

For the efficient recycling of products, it is generally necessary for the various components of those products to be separated from each other. That separation operation can be effected by suitable reversal of the assembly technology used in production of said products. Such a procedure however is very time-consuming and consequently inefficient. On the other hand, when dealing with products or components of products which are to be fed to a material recycling operation, at least partial destruction of the products or components does not have an adverse effect on the recycling quality so that it is possible to have recourse to destructive processes when dismantling products in order to increase the degree of flexibility and to improve the level of effectiveness.

For the purposes of separating components or structural parts or for the purposes of releasing mechanical connections, suitable forces must be applied to the corresponding components or products in a highly flexible, rapid and effective manner. That gives rise to problems in particular when suitable engagement surfaces for applying those separating forces are not available. Particularly when dealing with components that adjoin each other in flush and snug relationship, with complex separating joins, the application of suitable separation forces for dismantling purposes often gives rise to serious problems.

Hitherto for example chisels or bits have been used in order to apply suitable separating or wedging forces between product components or mutually adjoining constituent parts of products. Such chisels or bits however only have a relatively short effective travel, due to the principle on which they operate, so that generally further working steps are required for complete separation of components. In addition the use of chisels or bits requires components which are suitable for transmitting the necessary separating forces. For example the use of a chisel or bit gives rise to problems in dismantling plastic casings if the edges of the parts of the casing are not capable of transmitting the separating or dividing forces produced by the chisel or bit. When dismantling smooth plastic casings of that kind, it repeatedly happens that the casing fractures and the chisel or bit breaks away, which is an undesirable phenomenon that inter alia represents a risk of injury.

Instead of chisels or bits, use is often made of screwdrivers or crowbars in order to provide for the corresponding dismantling effect. Such tools are also only suitable for a limited function, that is to say in this case also further working steps may be necessary in order to dismantle the corresponding products.

An apparatus which utilises a wedge effect to split wood is known for example from EP 0 260 184 A1. That known apparatus has a wedging tool provided with two spreading limb elements which are mounted on the wedge element pivotably in opposite directions. When the wedge element is driven into the wood to be split, those spreading elements pass into the corresponding gap formed by the split and then further spread the wood apart. A similar wood splitting apparatus is known from U.S. Pat. No. 3,865,163. That known apparatus has a head part and at least two spreading elements which are movably connected to the head part so that a force applied to the head part or a pulse applied to the head part is respectively converted in the spreading elements into a component which is directed in the same direction as the applied force or the applied pulse, and a force component which is perpendicular thereto and which moves the parts to be separated away from each other. In that known tool which is only suitable and intended for splitting wood and not quite generally for separating parts which are connected together, the spreading elements are formed by rigid levers provided at their front ends with angle elements. In that structure, a splitting wedge on which the spreading members are pivotably disposed serves in known manner to split a piece of wood.

A hatchet or ax with lateral spreading elements is known from U.S. Pat. No. 4,372,360. That known hatchet or ax therefore utilises a similar spreading principle to abovementioned EP 0 260 184 A1 or U.S. Pat. No. 3,865,163.

SUMMARY OF THE INVENTION

The object of the present invention is to provide a separating tool for separating mutually connected parts, which is of a simple structure and with which separation of mutually connected parts, such as connected components or structural portions, can be effected without substantial problems.

The separating tool according to the invention has the advantage that, in a single working step, suitable engagement surfaces for the tool for applying the separating forces to the mutually connected parts are produced by suitable at least partial deformation of said parts and at the same time the separating forces for separating said parts are generated. The necessary separating forces are preferably applied by pulse-like blows to or hits on the head part and are transmitted to the parts to be separated. Those blows are produced by means of a conventional hammer, a pneumatic hammer or the like.

The at least two spreading elements can be connected by way of a connecting means. In that arrangement it is preferable if the connecting means are adapted to be adjustable. By virtue of suitable adjustment of the connecting means, it is possible to adjust as desired the transverse spacing between the spreading elements and thus the distribution of the forces which are to be applied to the parts to be separated, that is to say the ratio between the force component which acts in the same direction and the force component which is perpendicular thereto. The tool according to the invention is suitable by means of the spreading elements for dividing the force or pulse applied to the head part into a force component which is directed in the same direction as the applied force and a separating force component which is perpendicular thereto.

The force component which is directed in the same direction causes the free ends of the spreading elements, which are remote from the head part, to be pressed into the parts to be separated, that is to say, the tool provides for corresponding partial deformation of said parts in the region of the free ends of the spreading elements. In that situation, positively locking engagement occurs due to a change in shape or due to chip formation or a cutting effect. It is also possible for a frictional engagement between the free ends of the spreading elements and the parts to be separated to be sufficient to cause separation of the parts to be separated.

In the case of a tool of the above-indicated kind the spreading elements are desirably provided with resilient return elements. If the spreading elements are in the form of hinged toggle or elbow levers, the return elements are provided at the knee joints. The tool is returned to its starting position again by means of those return elements as soon as the tool is removed from the parts to be separated or which have been separated. That starting position can be defined by abutments provided on the tool.

Another embodiment of the tool according to the invention is characterised in that the two toggle levers are hingedly connected together by means of a scissor axis at the intersection of their second levers, wherein the scissor axis is linearly movably guided along a linear guide means which extends away from the head part. With such a tool, it is preferable for a resilient return element to be provided between the two toggle levers at the scissor axis. That tool also provides for a return to the starting position when the tool is removed again from the parts to be separated or which have been separated.

In the tool according to the invention, the two spreading elements can also be in the form of mutually crossing angle levers or bell crank levers which at one end are hingedly connected together by means of a hinge axis, wherein the hinge axis is linearly movably guided in a linear guide means projecting away from the head part and the linear guide means, at its end remote from the head part, has a spreader member which bears against the mutually crossing angle levers. In that arrangement the angle levers can be angled once or can be of a double-angled configuration, that is to say they can be of an S-like shape. The spreader member is provided to spread apart the two angle levers when a corresponding force or a suitable impulse is applied to the head part. The spreader member can be in the form of a roller or the like in order to minimise the degree of friction between the spreader member and the angle levers.

The free ends, remote from the head part, of the two spreading elements of the tool according to the invention, depending on the respective nature or the respective requirements of the parts to be separated, can each be provided with respective engaging or pressing members. The engaging or pressing members may be integral components of the two second levers or can be interchangeably disposed thereon. Interchangeable engaging or pressing members of elastomeric material are provided for example to produce between the separating tool and the parts to be separated, a frictional engagement by means of which the parts to be separated can be separated without damage thereto. The engaging or pressing members forming integral components of the two spreading elements can be formed for example by a tooth configuration or a serration configuration of the free ends of the two second levers of the separating tool. Engaging or pressing members of such a nature then usually result in a change in shape of the two parts to be separated, chip formation thereon or, in the extreme case, fracture of the parts to be separated. In that case therefore the forces transmitted are substantially higher than in the case of a frictional engagement between the separating tool according to the invention and the parts to be separated. So that the separating tool according to the invention can be used under the most widely varying limit or operating conditions, it is preferable for the engaging or pressing members to be disposed interchangeably or if necessary to combine same with integrally provided members.

Instead of applying the appropriate separating forces by way of the tool to the parts to be separated, it will be appreciated that it is also possible for the tool to be arranged stationarily and for the parts to be separated to be pressed against the tool. That pressing procedure can be effected manually or by machine continuously or discontinuously.

In accordance with the invention it is also possible for the head part to have a guide portion for a slide body connected to toothed rollers forming the spreading elements, and for the guide portion of the head part to be adjoined by a toothed bar or rack which extends through between the two toothed rollers and which is in meshing engagement with the two toothed rollers. In that arrangement it is desirable for a spring element to be provided between the head part and the slide body. That spring element is for example a compression coil spring which surrounds the head part. The slide body can be formed by a sleeve through which the head part extends. The connection between the two toothed rollers and the slide body is formed for example by means of a frame which presses the toothed rollers against the rack in order at any time to provide for the meshing engagement between the two toothed rollers and the rack. The rack extends through between the two toothed rollers which are suitably spaced from each other and it is therefore provided with tooth configurations which face away from each other.

The tool according to the invention is advantageously suitable for separating components which are in mutually adjoining flush and snug relationship. If the parts or components to be separated have suitable shaped portions such as grooves, steps, projections or the like, it will be appreciated that they can be combined in the optimum fashion with the separating tool according to the invention, that is to say in such a case the separating tool according to the invention is desirably applied to said shaped portions in order to separate the components from each other. Since, as mentioned above, the tool according to the invention is advantageously also suitable for separating components which adjoin each other in flush relationship, it is possible without difficulty in the optimum manner to separate from each other casings and/or components of electrical or electronic equipment and any other parts and items of apparatus. There are therefore marked increases in efficiency in comparison with the previous operating procedure involved in dismantling operations. It will be appreciated that the tool according to the invention can also be used in the optimum fashion for example in repair works such as motor vehicle repair works and the like. Furthermore the tool according to the invention can be used for example as a pair of nutcrackers. That affords the quite considerable advantage that a corresponding nut can be divided into two halves without in that case causing the kernel of the nut to be destroyed by being crushed.

The head part can form a connecting part to a power-operated tool. That tool may be a pneumatic hammer or chisel.

BRIEF DESCRIPTION OF THE DRAWINGS

Embodiments of the separating tool according to the invention are described hereinafter and illustrated in the drawings in which.

DETAILED DESCRIPTION OF PREFERRED EMBODIMENTS

Figure 1:
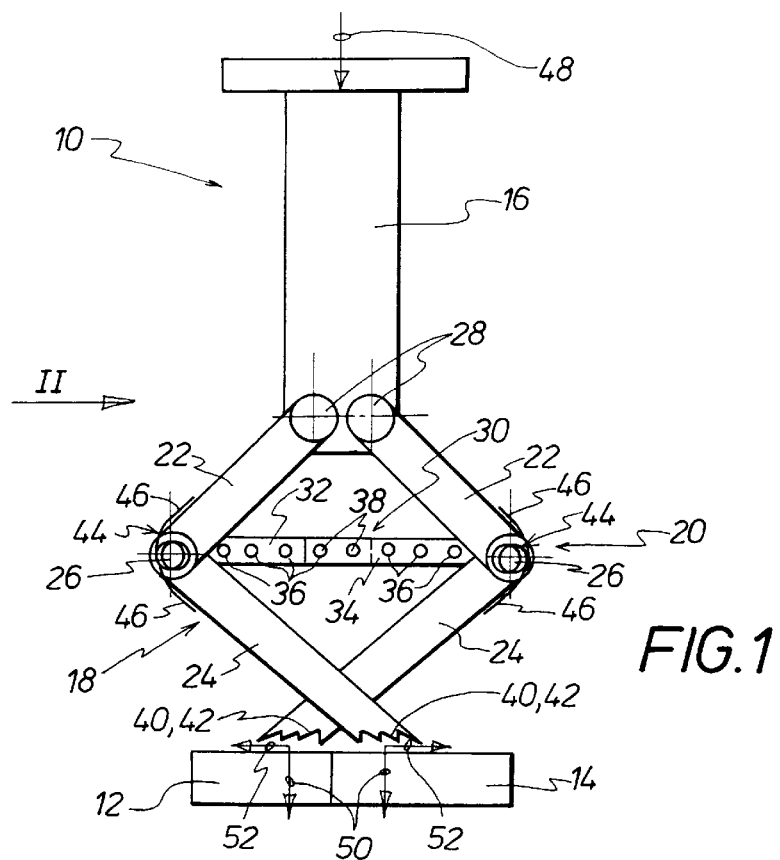
FIG. 1 is a view from the front of a first embodiment of the separating tool.
Figure 2:
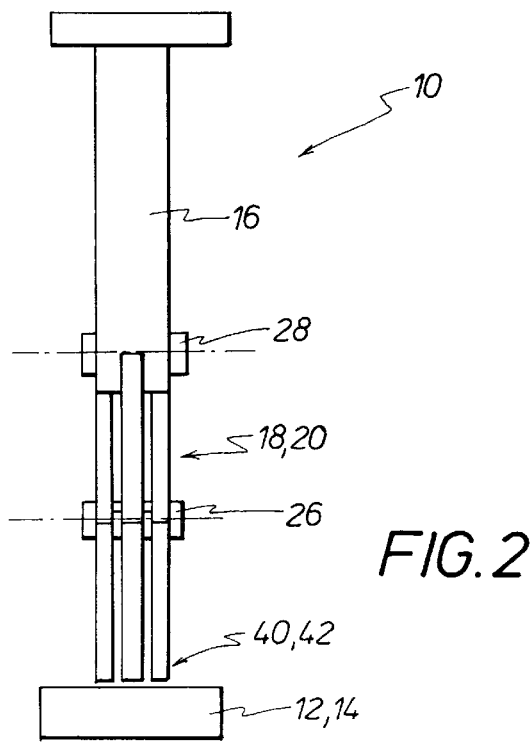
FIG. 2 is a side view of the tool shown in FIG. 1 viewing in the direction indicated by the arrow II.

FIGS. 1 and 2 show a first embodiment of the separating tool 10 which is provided for separating parts 12 and 14 which are connected together. The parts 12 and 14 adjoin each other in flush relationship.

The separating tool 10 has a head part 16 from which two elbow or toggle levers 18 and 20 project at the underside thereof. Each toggle lever 18 and 20 respectively has a first lever 22 and a second lever 24, which are each hingedly connected together by means of a knee joint 26. The two first levers 22 of the toggle levers 18 and 20 are hingedly connected to the head part 16 by means of associated hinge axes 28, and they extend away from the head part 16 in mutually spread relationship.

The two toggle levers 18 and 20 are connected together by way of a connecting means 30 which extends between the two knee joints 26 and which is adapted to be adjustable. For that purpose the connecting means 30 has two elongate elements 32 and 34 which overlap to a greater or lesser degree according to the desired spacing between the two knee joints 26 and which are connected together at the common over region. For that purpose the elongate elements 32 and 34 can be provided with holes 36. Fixing pins 38 can be fitted through the holes 36 in the overlap region. Those fixing pins 38 are for example screwthreaded pins, screws or the like.

The free end 40, remote from the head part 16, of each of the two second levers 24 of the two toggle levers 18 and 20 is provided with engaging or pressing members 42 which can be in the form of teeth, a serration configuration or the like. FIG. 1 shows a construction in which the engaging or pressing members 42 are integral components of the second levers 24.

The two toggle levers 18 and 20 are provided with resilient return elements 44 which for example are in the form of spiral or coil springs with fixing end portions 46. In the embodiment of the separating tool 10 shown in FIGS. 1 and 2 the resilient return elements 44 are provided at the knee joints 26 of the two toggle levers 18 and 20.

When a separating force or a pulse is applied to the head part 16 of the separating tool 10, as indicated by an arrow 48 in FIG. 1, that force or pulse (arrow 48) is transferred into force components 50 which are directed in the same direction and force components 52 which are perpendicular to the components 50 and which are oriented away from each other, in which case the force components 50 in the same direction result in a change in shape of the parts 12 and 14 to be separated from each other and the force components 52 which are oriented away from each other simultaneously result in separation of the parts 12 and 14 to be separated.

Figure 3:
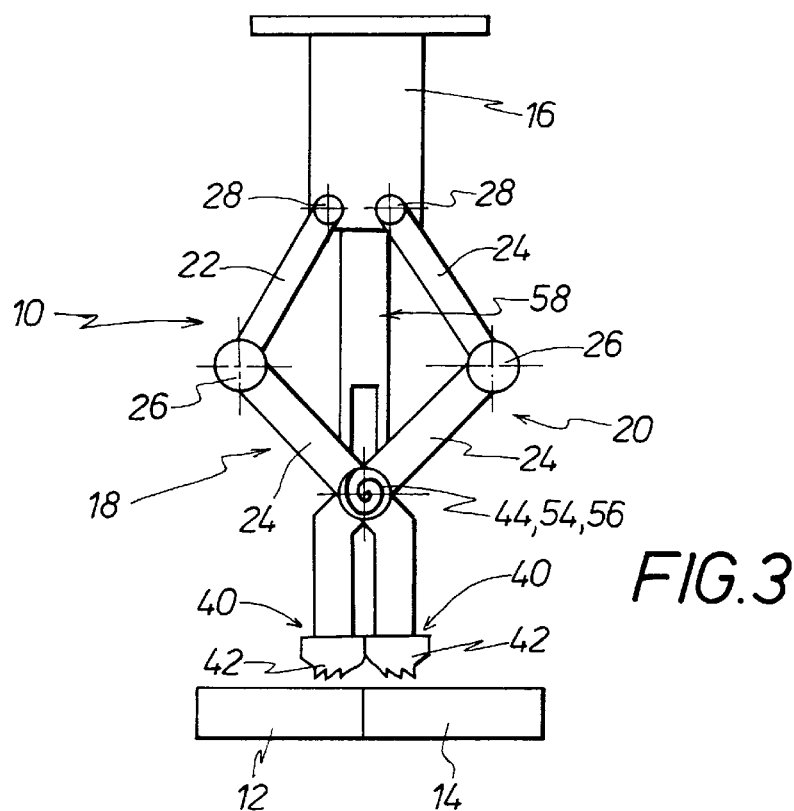
FIG. 3 is a front view similar to FIG. 1 showing a second embodiment of the separating tool.
Figure 4:
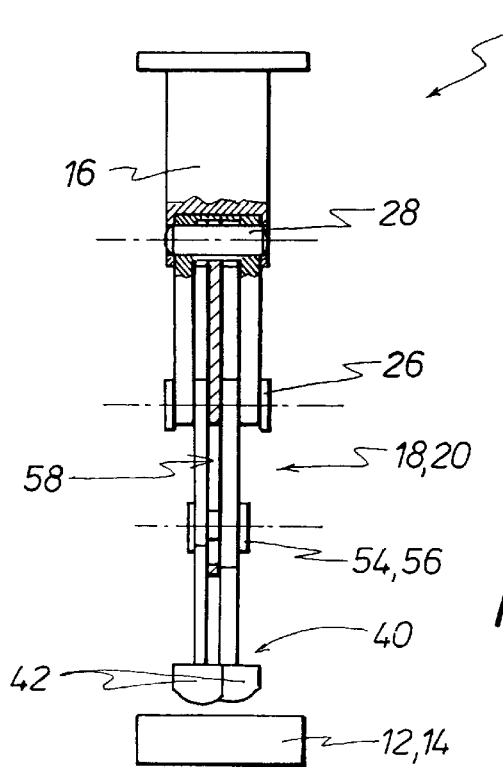
FIG. 4 is a side view similar to that shown in FIG. 2 in partly cut-away view illustrating the separating tool of FIG. 3.

FIGS. 3 and 4 illustrate a second embodiment of the separating tool 10 which differs from the embodiment shown in FIGS. 1 and 2 in particular in that the two toggle levers 18 and 20 are hingedly connected together by means of a scissor axis 56 at the intersection 54 of the second levers 24 of the two toggle levers 18 and 20. A linear guide means 58 projects downwardly away from the head part 16 of the separating tool 10. The scissor axis 56 is linearly movably guided along the linear guide means 58. A further difference in relation to the embodiment of the separating tool 10 shown in FIGS. 1 and 2 is that the two second levers 24 are not of a rectilinear configuration but extend in an angled configuration and have interchangeable engaging or pressing members 42 at the free ends 40 of the second levers 24, being the ends which are remote from the head part 16.

In addition, the embodiment of the separating tool 10 shown in FIGS. 3 and 4 has a single resilient return element 54 which is disposed between the two toggle levers 18 and 20 or between the second levers 24 of the two toggle levers 18 and 20, at the scissor axis 56.

In other respects the same details are denoted in FIGS. 3 and 4 by the same references as those used in FIGS. 1 and 2 so that there is no need for all those features to be described in detail once again in connection with FIGS. 3 and 4.

Figure 5:
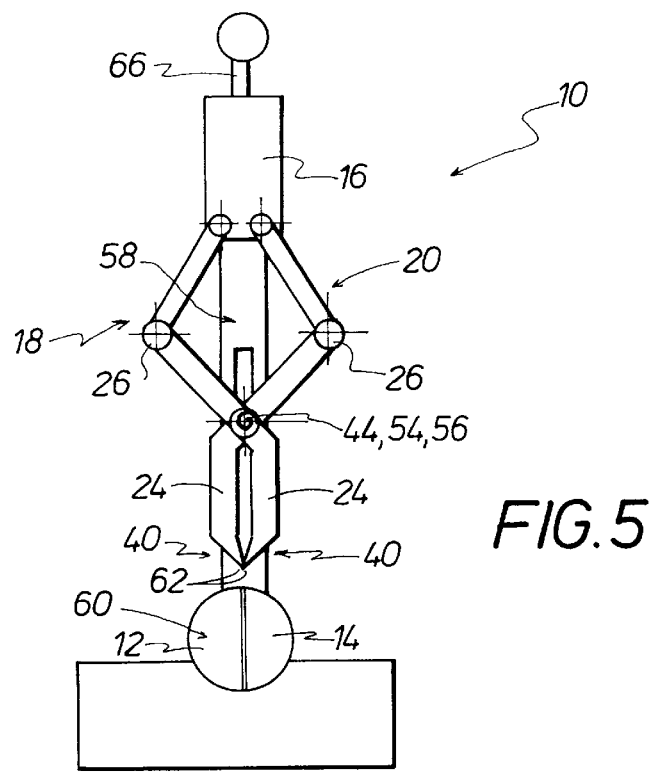
FIG. 5 is a front view of a third embodiment of the apparatus in the form of a nutcracker.
Figure 6:
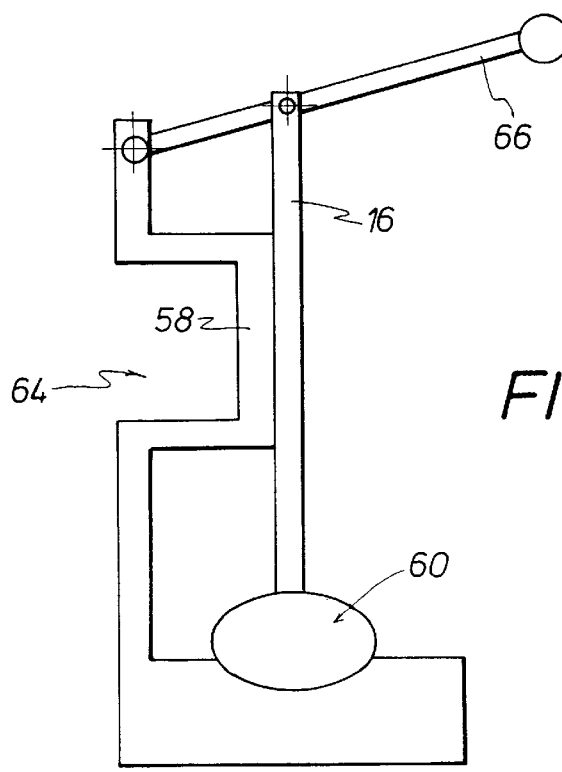
FIG. 6 is a side view of the nutcracker shown in FIG. 5.

FIGS. 5 and 6 show a separating tool 10 which is in the form of a pair of nutcrackers. Reference numeral 60 denotes a nut which can easily be divided into two halves with the separating tool 10 shown in FIGS. 5 and 6 without causing the kernel of the nut 60 to be crushed. The separating tool shown in FIGS. 5 and 6 differs from the separating tool 10 shown in FIGS. 3 and 4 in that the free ends 40 of the two second levers 24 of the toggle levers 18 and 20 are each provided with a cutting edge 62 as the engaging or pressing member. A further difference is that the head part 16 is provided on a stand arrangement 64 on which an actuating lever 66 is pivotably movably supported (see FIG. 6). The two toggle levers 18 and 20 are linearly movably guided along a linear guide means 58 which is a component of the stand arrangement 64, as can be seen from FIG. 6.

The same features are identified in FIGS. 5 and 6 by means of the same references as those used in FIGS. 1 through 4 so that there is no need for all those features to be described in detail once again in connection with FIGS. 5 and 6.

Figure 7:
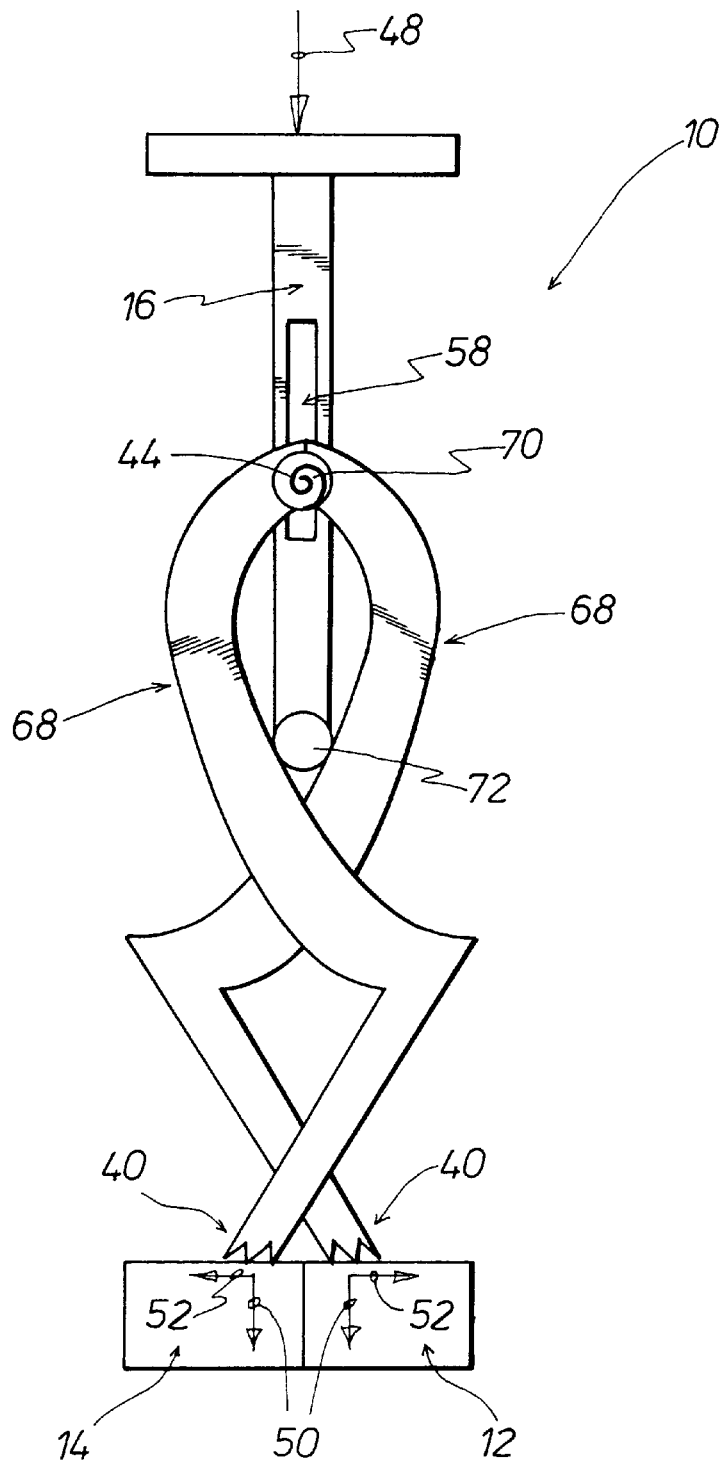
FIG. 7 is a front view corresponding to FIGS. 1, 3 and 5 of a fourth embodiment of the separating tool.

FIG. 7 is a front view of a further embodiment of the separating tool having a head part 16 and two spreading elements which are movably connected to the head part 16 and which are in the form of mutually crossing angle or bell crank levers 68. The two angle levers 68 are connected by means of a hinge axis 70 at their one end, that is to say the end associated with the head part 16. The hinge axis 70 extends through a linear guide means 58 which projects away from the head part 16. The hinge axis 70 is arranged to be linearly movably guided along the linear guide means 58 and it is provided with a resilient return element 44.

The two angle levers 68 can be of a singly angled configuration or, is shown in FIG. 7, they can be of a doubly angled configuration, that is to say they can be of an S-like shape.

At its end remote from the head part 16 the linear guide means 58 is provided with a spreader member 72 which bears against the two angle levers 68. When a force or a pulse is applied to the head part 16, as is indicated by the arrow 48, that produces, at the free end 40 remote from the head part 16 of each of the two angle levers 68, a force component which is in the same direction and which is indicated by the arrows 50, and a respective force component illustrated by the two arrows 52 which face away from each other, the force components 52 being perpendicular to the force components 50. The force components 52 cause separation of the parts 12 and 14 to be separated.

Figure 8:
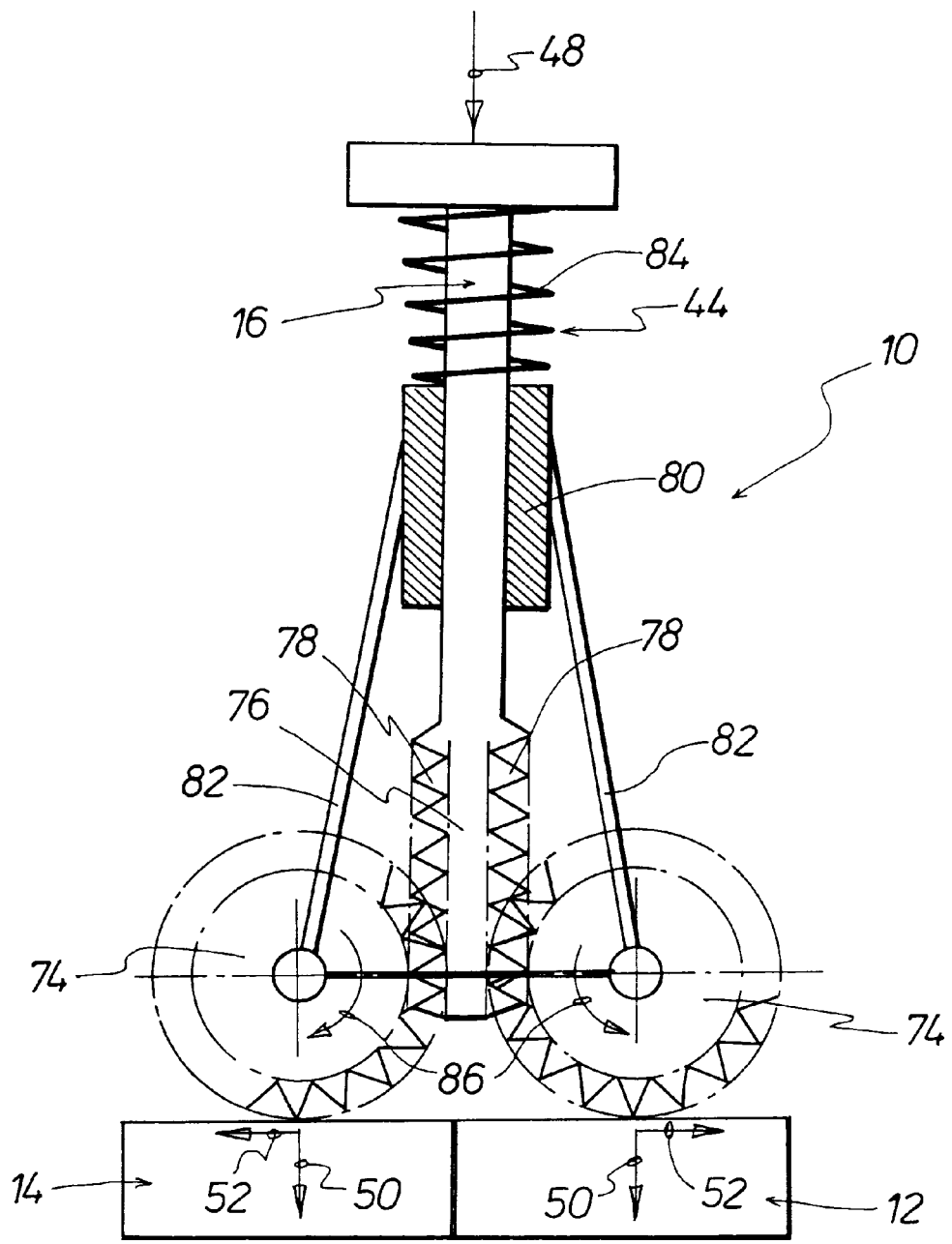
FIG. 8 is a front view in partly cut-away form of a fifth embodiment of the separating tool.

FIG. 8 diagrammatically shows a front view of an embodiment of the separating tool 10 in which the spreading elements are formed by toothed rollers 74. The two spaced-apart toothed rollers 74 mesh with a toothed bar or rack 76 which is provided with two tooth configurations 78 that face away from each other. The rack 76 projects away from the head part 16 of the separating tool 10. The head part 16 extends in captive relationship through a slide body 80. The slide body 80 is shown in longitudinal section in FIG. 8 and is for example in the form of a sleeve. The two toothed rollers 74 are connected to the slide body 80 and to each other in such a way that the two toothed rollers 74 are in meshing engagement with the two tooth configurations 78 of the rack 76. That connection between the toothed rollers 74 and the slide body 80 and between the toothed rollers can be made by means of a resilient frame structure or the like.

Provided between the head part 16 of the separating tool 10 and the slide body 80 is a resilient return element 44 which for example is in the form of a compression coil spring 84.

References 12 and 14 also identify in FIG. 8 two parts which are to be separated from each other. When a force or a pulse is applied to the head part 16, as indicated by the arrow 48, then the two toothed rollers 74 are driven in the direction of the arcuate arrows 86 by means of the rack 76, that is to say, this arrangement also provides for suitable division of the force (arrow 48) into force components which are directed in the same direction, as indicated by the arrows 50, and force components which are perpendicular thereto and which are indicated by the arrows 52 and which are operative to separate the parts 12 and 14 from each other.

I claim:

1. A tool for separating mutually connected parts, comprising:

a head part;

at least first and second spreading elements, including resilient return means operatively associated with the spreading elements; and means movably connecting the spreading elements to the head part so that a force applied to the head part is converted in the spreading elements into a first component which is directed in the same direction as the applied force and further components which are perpendicular to the first component thereby to move the parts to be separated away from each other, wherein the spreading elements include toggle levers each comprising a first lever, a second lever, a knee joint hingedly connecting the respective first lever to the associated second lever, and means connecting the spreading elements together, the respective first lever being hingedly spread away from the head part and the second levers which are remote from the head part crossing each other.

2. A tool for separating mutually connected parts as set forth in claim 1, including a linear guide means projecting away from the head part and having an end remote from the head part;

wherein the spreading elements comprise mutually crossing angle levers having first ends towards said head part, and a pivot axis means hingedly connecting said angle levers together at said first ends and linearly movably guided by said guide means; and a spreader member on said guide means and adapted to bear against the mutually crossing angle levers.

3. A tool for separating mutually connected parts as set forth in claim 1, including engaging members at the free ends of the spreading elements, which are remote from the head part.

4. A tool for separating mutually connected parts as set forth in claim 3, wherein the engaging members are integral components of the spreading elements.

5. A tool for separating mutually connected parts as set forth in claim 3, wherein the engaging members are interchangeably disposed on the spreading elements.

6. A tool for separating mutually connected parts as set forth in claim 1, wherein the head part forms a connecting part adapted for connection to a power-operated tool.

7. A tool for separating mutually connected parts, comprising:

a head part;

at least first and second spreading elements;

means movably connecting the spreading elements to the head part so that a force applied to the head part is converted in the spreading elements into a first component which is directed in the same direction as the applied force and further components which are perpendicular to the first component thereby to move the parts to be separated away from each other;

a guide means on the head part;

a slide body slidable on the guide means;

toothed rollers forming said spreading elements;

means connecting said toothed rollers to said slide body; and a rack adjoining the guide means of the head part and extending through between the toothed rollers in meshing engagement with the toothed rollers.

8. A tool for separating mutually connected parts as set forth in claim 7, including a resilient return means operative between the head part and the slide body.

9. A tool for separating mutually connected parts as set forth in claim 7, wherein the head part forms a connecting part adapted for connection to a power-operated tool.

10. A tool for separating mutually connected parts, comprising:

a head part;

at least first and second spreading elements;

means movably connecting the spreading elements to the head part so that a force applied to the head part is converted in the spreading elements into a first component which is directed in the same direction as the applied force and further components which are perpendicular to the first component thereby to move the parts to be separated away from each other;

wherein the spreading elements include toggle levers each comprising a first lever, a second lever, a knee joint hingedly connecting the respective first lever to the associated second lever, and means connecting the spreading elements together, the respective first lever being hingedly spread away from the head part and the second levers which are remote from the head part crossing each other;

including a scissor axis means hingedly interconnecting the toggle levers at the intersection of their second levers;

a linear guide means which projects away from the head part for linearly movably guiding said scissor axis means;

including a resilient return means operative between the toggle levers at the scissor axis means.

* * * * *